INVENTOR.
CARL JOHAN LOCKMAN
BY
ATTORNEY.

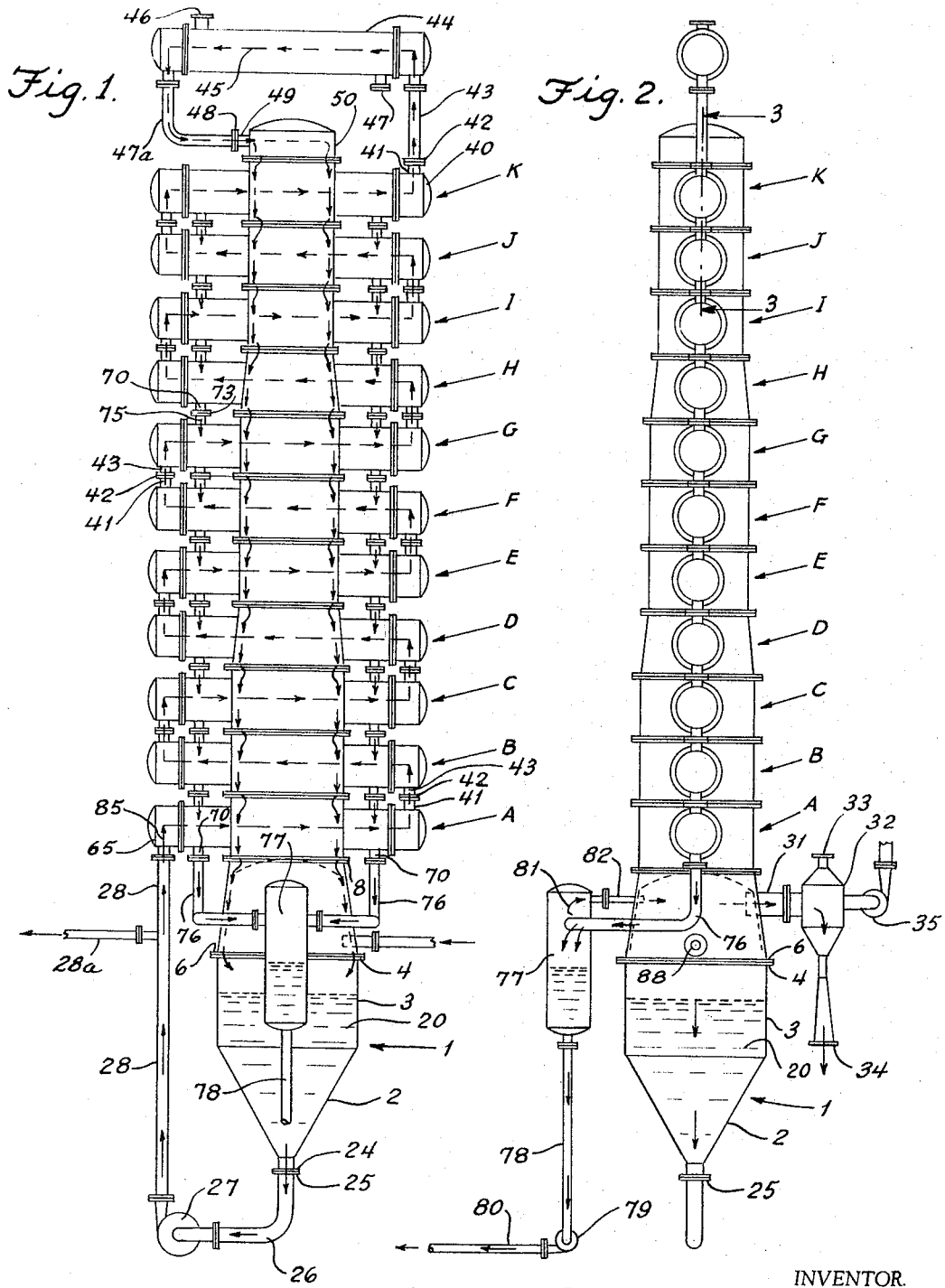

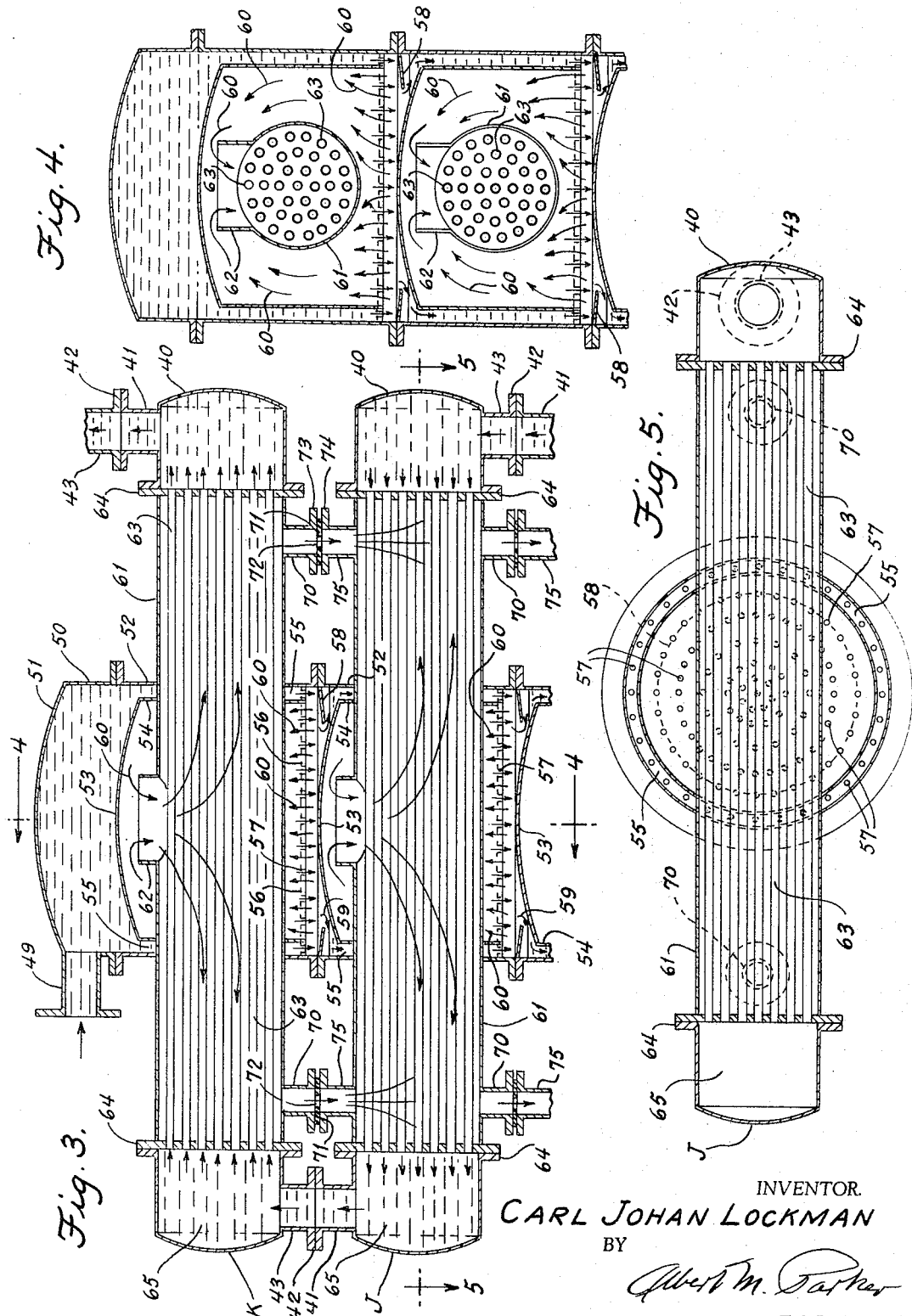

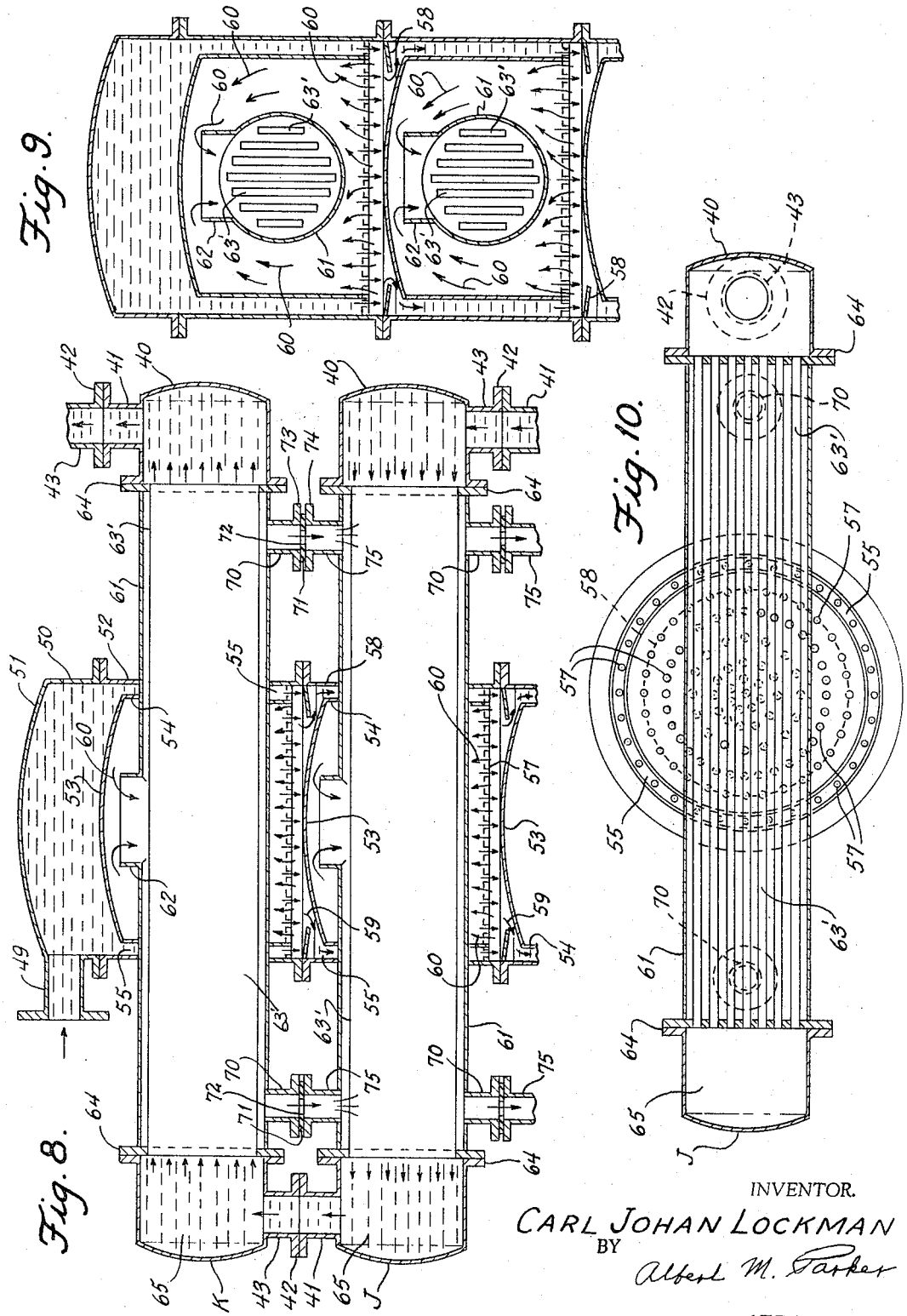

United States Patent Office 3,304,242
Patented Feb. 14, 1967

3,304,242
MULTI-STAGE FLASH EVAPORATORS
Carl Johan Lockman, Rindogatan 14,
Stockholm, Sweden
Filed Nov. 19, 1965, Ser. No. 514,746
5 Claims. (Cl. 202—173)

This application is a continuation-in-part of application Ser. No. 233,269, filed October 26, 1962, for "Multi-Stage Flash Evaporators," now abandoned.

This invention relates to multi-stage flash evaporators and is particularly concerned with such evaporators whose construction is simplified and made more economical by the building of the heat exchangers and vapor bodies as units and then assembling those units in a particularly advantageous manner.

Though the evaporator of the invention is admirably adapted for the evaporation of waste sulphite liquor and will be described from that standpoint, it is, of course, to be understood that the scope of the invention is not to be considered as being limited thereby. On the contrary, the ultilization of the apparatus is contemplated for the evaporation of all liquids for which the construction and functioning of it are adapted.

During the periods of high fuel costs, such as during the second World War, sulphite waste liquor could be evaporated economically, but, with the availability of relatively inexpensive fuels, that cannot be done unless the capital cost of the equipment can be reduced beyond that which has heretofore been the case. Heretofore the efforts to reduce this cost have principally been directed toward creating more efficient and cheaper heating surfaces. Great progress has been made in this area, but it has not brought down the overall cost of evaporators to sufficient extent, since the members providing the heating surfaces only constitute about one-third of the total evaporator cost. In the apparatus of the invention, then, the effort has been to improve and simplify the other aspects of the evaporator, making up the remaining two-thirds of the cost.

The first step in the invention improvement is to build the heat exchangers and the vapor bodies into single units where the heat exchangers are combined with and actually extend through the housings forming the vapor bodies with the operable relationship between the heat exchangers and the vapor bodies being such that all vapor lines are eliminated. Then, as a next step, the vapor bodies carrying the heat exchangers are formed to be mounted on top of each other in the form of a column. In this way one head for each vapor body is eliminated and the remaining heads, or false bottoms of each vapor body, are subject from one to the next to lower differential pressures. Importantly, from the standpoint of economy and apparatus, the liquor piping between the vapor bodies is eliminated, only one set of legs is needed to support the whole column, the erection work is greatly simplified, space requirements are considerably reduced and, due to the piping having been reduced to a minimum, the insulation costs are very low.

The height of the column is kept down by the manner in which the liquor is held by each vapor body for subsequent flashing and by the manner in which the bottom of one and top of the other vapor body are correlated.

The column design and the constant operating conditions which will prevail therein establish perfect conditions for using orifice plates for controlling the flow of liquor and condensate through the system. On the liquor side the orifice plates are dimensioned to provide a safe column of liquor before the pressure difference across the orifice plate allows the designed flow rate to pass. On the condensate side, on the other hand, the orifice plate should pass a small amount of steam with the condensate for this advantageously provides venting for the heat exchangers without any special piping.

From the foregoing it will be apparent that the evaporator construction of the invention not only materially economizes and simplifies as against prior constructions, but also improves and simplifies the operation, saves space and reduces maintenance work.

It is, accordingly, the principal object of the invention to simplify and economize on the construction of evaporators.

Another object is to effect such simplification and economy in multi-stage flash evaporators.

Another object is to provide multi-stage evaporators wherein all vapor lines are eliminated.

Still another object is to provide multi-stage flash evaporators wherein the liquor piping between the vapor bodies is eliminated.

Still another object of the invention is to provide multi-stage flash evaporators wherein the erection work is greatly simplified.

A further object of the invention is to provide for construction modification and assembly arrangement in flash evaporators in such a manner as to eliminate considerable structure heretofore thought necessary.

A still further object of the invention is to simplify the functioning of multi-stage flash evaporators and at the same time to improve their operation.

Still further and more detailed objects of the invention will in part be obvious and in part be pointed out as the description of the invention taken in conjunction with the accompanying drawing proceeds.

In that drawing:

FIG. 1 is a front elevation of a first disclosed embodiment of flash evaporator formed of a column of expansion chamber or vapor body and heat exchanger units in accordance with the invention;

FIG. 2 is a side elevation thereof;

FIG. 3 is an enlarged vertical section taken on lines 3—3 of FIG. 2 of the upper two units of the evaporator in accordance with the invention;

FIG. 4 is a vertical section taken on line 4—4 of FIG. 3 and looking in the direction of the arrows;

FIG. 5 is a horizontal section taken on line 5—5 of FIG. 3 and looking in the direction of the arrows;

FIGS. 8, 9, and 10 are views similar to FIG. 3, 4, and 5, respectively, of a modified evaporator employing flat, vertically disposed heating elements rather than cylindrical heating elements as in the first disclosed embodiment.

Figure 6:
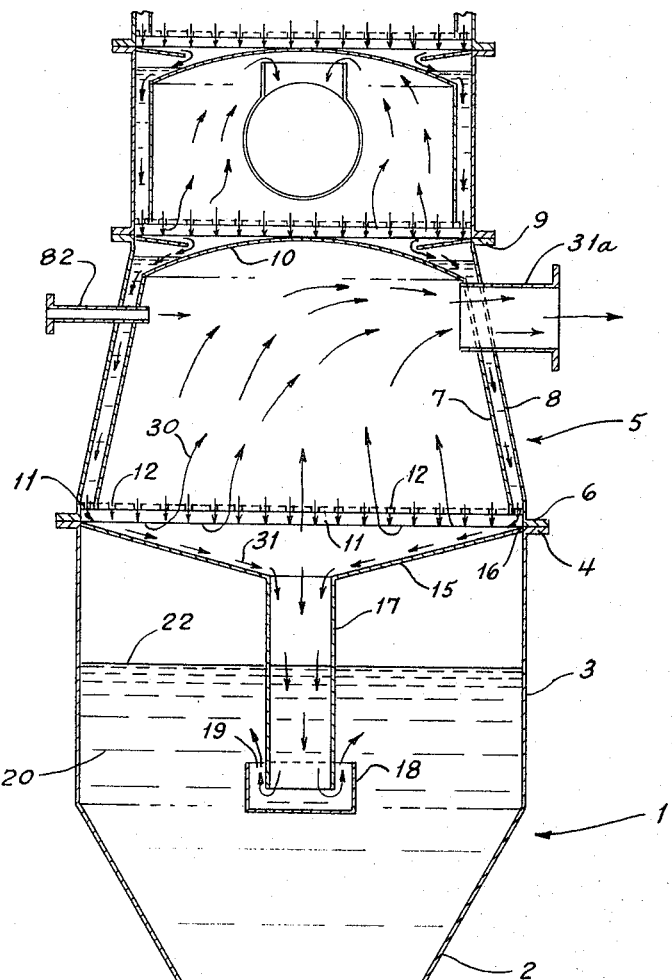
FIG. 6 is an enlarged vertical section of the lowermost unit of the evaporator with the chamber extending below the same for the last stage of evaporation and for liquor accumulation.

Commencing at the bottom chamber of the evaporator, as seen in FIGS. 1 and 2 and in greatly enlarged form in FIG. 6, a bottom accumulator tank, generally indicated at 1, is formed with a lower frusto-conical portion 2 extending up into an upper cylindrical portion 3, which carries an outwardly extending flange 4 around its upper end. The lowermost of the expansion chambers or vapor bodies generally indicated at 5, forms the top portion of the bottom chamber. This vapor body has a flange 6 around its base which is suitably engaged with the flange 4 to mount this vapor body on top of the accumulator tank 1. The vapor body 5, characteristic of the various vapor bodies of the units mounted above it, as will be pointed out hereinafter, has a side wall formed of inner and outer side wall members 7 and 8 which are concentric frusto-conical members commencing in the plane of the securing flange 6 where the outer wall 8 has the same diameter as the cylindrical wall 3 of the accumulator tank. From that position the side wall of the vapor body extends upwardly to where the outer wall member 8 thereof terminates in an outwardly extending securing flange 9. At its upper end the inner wall member 7 continues into the dome-shaped top or upper end 10 of the vapor body, which closes off the upper end of the vapor body. A closing ring 11 is seated in the mouth formed between the lower ends of the walls 7 and 8 and is provided with a multiplicity of orifice openings 12 extending downwardly therethrough.

A downwardly and inwardly inclined annular plate 15, (FIGS. 6 and 7) commences at the upper end of the cylindrical side wall 3, as seen at 16, and extends downwardly and inwardly to an inner border where it is joined to a directly downwardly extending cylindrical conduit 17. This conduit extends downwardly a substantial distance in this instance close to the bottom of the cylindrical wall 3, and is provided at its lower end with a trap 18. This trap serves as a liquid seal against the passage of vapors but allows liquor to flow down to the bottom of the conduit 17 and then up out of the opening 19 provided by the trap so as to join the accumulated body of liquor 20 within the bottom tank 1.

As seen in FIGS. 1, 2 and 6, a substantial depth of the accumulated liquor is maintained in the tank 1, here shown as extending up to the level 22 well up along the side of the conduit 17, thereby making the trap 18 effective. Suitable liquid level maintaining means may be provided if desired, but it is not an essential of the invention so is not included here.

At its bottom end the tank 1 has its conical portion 2 joined to an outlet conduit 23 flanged at 24 for connection with a flange 25 (FIGS. 1 and 2) carrying the commencing portion 26 of a return conduit which is suitably joined to a pump 27. The pump 27 takes accumulated liquor from the source 20 and pumps it up the conduit 28 for return to the system for heating and vaporization, as well appear hereinafter. Excess or waste may be taken off from the conduit 28 through the laterally extending conduit 28a as desired.

Starting again from the vapor body 5, it is seen that orifices 12 in the ring 11 are so formed as to permit liquor at the proper rate to pass therethrough with a full head of liquor in the chamber between the walls 7 and 8. That liquor will drop onto the upper surface of the plate 15 where, though it is at the lowest temperature in the system, it will be exposed to the lowest pressure, so part of it will flash and pass upwardly, as indicated by the arrows 30, in the form of vapor and the remainder, still in liquid form, will flow down the plate 15 as indicated by the arrows 31 and be collected in the accumulator chamber below.

Referring to FIG. 6, it will be seen that the flashed vapor 30 flows out through the large conduit 31a extending through the wall of the vapor body 5 adjacent its upper end. In fact, the vapor 30 is drawn through this conduit for, as seen in FIG. 2, the conduit 31a joins up with a spray or barometric condenser 32 which, if of the spray type, has water entering it at 33, with a mixture of water and condensed vapor being discharged at 34. In addition, and importantly, the condenser 32 has a vacuum pump 35 connected to it. This pump 35, along with the drop in temperature of the steam of the flashing vapor, creates the vacuum for the system.

As already pointed out, evaporation in accordance with the system of the invention takes place step by step in a plurality of vapor bodies mounted one on top of the other in a vertical column. The flashing vapor in each vapor body flows around the portion of the shell of a heat exchanger, here illustrated as an indirect cylindrical tubular type, which extends from outside the vapor body at one side, through the same and out at the other side. Each heat exchanger has an opening at its top within the vapor body so that the flashed vapors can flow into it and around the tubes carrying the liquor to be heated. The flashed vapors are thereby substantially condensed and are drawn off as condensate with a small amount of vapor, to be passed directly into the shell of the next lower heat exchanger, eventually being taken off at the bottom of the column as product condensate. What is important here is that all of the units in the column, each of which consists of an evaporator, a vapor body, and a heat exchanger are, with the exception of moderate change by way of increase in size of vapor bodies from top to bottom of the column, just the same. Thus only one unit needs to be described in detail and that is what will be done, merely making reference to the size change to explain the difference in showing in the drawing.

It is desired to keep the overall height of the system down as much as possible so as to save work for the pump 27. This is achieved in accordance with the invention by closely coordinating each unit with the one next to it. Thus though eleven stages or units indicated by the letters A-K are here provided, the overall height of the apparatus is the absolute minimum, thus making for the best economy in an evaporator-heat exchanger system.

Referring now to FIGS. 1 and 2 and then to the top of the column, the provisions for heating and flashing liquor recirculated from the body of liquor 20 in the accumulator tank 1 will be considered. It is to be appreciated that such liquor is introduced into the column at the bottom unit A and flows out from the uppermost heat exchanger forming part of the unit K. This liquor has been heated in its path up through all of the units of the column by the flashed vapor from previously heated liquor. Leaving the unit K the liquor flows from the end chamber 40 at the right-hand end of the unit, as seen in FIG. 3, through the short outlet conduit 41 which is joined at 42 to another conduit 43. The conduit 43 in turn connects up with an individual heat exchanger 44. Here the liquor, indicated at 45, passes in contracurrent flow and in indirect heat exchange relationship with the live steam introduced into the heat exchanger 44 at 46. The condensate from that live steam is taken off at 47. The liquor 45, now at its highest temperature, flows down out of the left-hand end chamber of the heat exchanger 44 through the conduit 47a connected at 48 with the short entrant circuit 49 of the small domed cylindrical receiving tank 50 at the top of the column of units. As an illustrative non-limiting example, the liquor here would be at a temperature of 125° C.

The tank 50 has a domed top 51, a cylindrical side wall 52 and a domed bottom 53. The bottom 53 likewise forms the top of the first of the vapor bodies, i.e., the vapor body of the unit K at the top of the column. At its periphery the bottom 53 terminates in an inside cylinder wall 54 spaced inwardly from the outside wall 52 so as to provide an annular liquor chamber 55. The liquor chamber 55 is thus contained within the double walled side wall of the vapor body.

At its annular bottom end the liquor chamber 55 is closed by a ring 56. This ring carries a multiplicity of suitably formed orifice members seated in circumferentially spaced openings 57 therein to provide for a controlled flow of liquor therethrough. Lying beneath this ring and extending radially inwardly thereof at a downward incline is an annular distributor surface. This surface is provided by an annular plate 58 suitably secured at its outer periphery to the outside wall 52 of the vapor body of the next lower unit J. At its inner periphery the plate 58 terminates at a position 59 spaced just above the domed top 53 of the vapor body of the next lower unit J. This spacing, as seen in FIGS. 3 and 4, is sufficient to allow liquor which runs down onto and over the plate 58 from the openings in the orifices 57 to flow down over the peripheral portion of the domed top 53 underneath the plate 58. This liquor accordingly forms a liquid column or liquor body between the walls 52 and 54 of the unit J in all respects, with the exception of temperature and pressure, the same as the liquor body in the chamber 55 of the unit K.

Part of the liquor dropping onto the plate 58, however, will flash into vapor for the pressure in that zone is such, in relation to the temperature of the liquor, that flashing takes place. This vapor on flashing flows up through openings in the bottom of the vapor bodies and around the cylindrical outer shell 61 of the heat exchanger for the unit K. The shell 61 is provided at the midposition of its top with a large opening surrounded by a collar 62. The vapor 60 flows down into the shell through the collar 62, and flows all around the bundle of tubes 63 extending throughout the length of the shell 61.

The tubes 63, as seen in FIG. 3, extend through headers 64 to communicate with the chamber 40 at the right-hand end of the heat exchanger and the chamber 65 at the left-hand end thereof. The headers 64 isolate the liquor flowing through the tubes 63 from the vapors 60 flowing into the shell through the collar 62, but the higher temperature of those vapors is communicated through the tubes in indirect heat relationship to the liquor flowing through the tubes. This liquor, as seen in FIG. 3, flows from left to right through the unit K on its way up the column. In the unit J the liquor flows from right to left, as seen by the arrows. From the left-hand end of unit J the liquor flows up through the coupling elements 41, 42, 43, into the left-hand chamber 65 of the unit K. This back and forth flow of liquor from one unit to the next prevails throughout the height of the column.

To a large extent the vapor 60 is condensed as it flows about the tubes 63 so that it collects in the bottom of the shell 61 and flows downwardly therefrom through the outlet pipes 70, one at each end of the shell 61. This downward flow, however, is restricted against too much of a pressure change by means of orifice plates 71 having openings 72 therein so that a proper head of condensate is needed before flow takes place.

It is advantageous that in addition to the condensate flowing through the orifice opening 72, a certain amount of vapor will also flow so as to keep the passageway clear against being clogged or closed down by condensate.

The orifice plates 71 as here shown are clamped between the flanges 73 and 74 which couple the short exit conduits 70 with the similar short entrant conduits 75 opening through the top of the shell 61 for the next lower effect. Again, as in the case of the upward flow of liquor, this arrangement for the downward flow of condensate repeats itself down through the column. This is illustrated where the shell 61 of the unit J has outlet conduits 70 which join up to the inlet conduits 75 of the next lower heat exchanger shell. Condensate is, of course, added to and accumulates from effect to effect on the way down the column. It flows largely as liquid but with sufficient vapor leaving each shell to keep the orifices clear.

To complete the condensate collecting aspect of the apparatus, attention is directed to the lower portion of FIGS. 1 and 2. In FIG. 1 two pipes 76 are shown extending down from the outlet conduits 70 from the heat exchanger shell of the lowest effect or unit A. Condensate is drawn off through these pipes and is collected in the condensate receiving tank 77. The condensate is drawn off from the bottom of the tank 77 through the conduit 78 by means of the pump 79 and is directed through the conduit 80 to the location desired. It is additionally to be noted by reference to FIG. 2 that whatever vapor remains with the condensate flowing into the tank 77 separates and flows upwardly as indicated at 81 and passes through a conduit 82 (see also FIG. 6) in the uppermost part of the lowest vapor body 5. Thus the vapor flowing through the conduit 82 joins the vapor 30 in the vapor body 5 and flows out through the larger conduit 31a.

Liquor from the source 20 starts its upward flow by being pumped, as seen at 85, into the left-hand end chamber 65 of the unit A of the column. Then, as indicated above, it flows to the right, leaves the heat exchanger through the short conduit 41 and enters the right-hand end of the heat exchanger unit B through the short entrant conduit 43. Then it flows back again to the left and upwardly into the left-hand end of the heat exchanger for the unit C. The connections between the heat exchangers for effecting this flow are all the same except for their position, one being at the right and the other at the left, so that the same reference characters are used for them throughout. It will be obvious from the showing of the arrows in FIG. 1 indicating the path of flow of the liquid how it follows its zig zag course up through the whole column while being heated from effect to effect or unit to unit by flashed vapor. Eventually the liquor reaches the top of the column, and, as explained heretofore, is given additional heating by means of live steam following which it starts back down through the vapor bodies and is flashed periodically. The vapor bodies, heat exchangers, and connections of each unit are, save for size, the same throughout the column, so the same reference characters are employed throughout and the detailed description of units K and J is applicable to the remaining units.

Regarding the size difference, as seen in FIGS. 1 and 2, the vapor bodies for units K, J, and I have the smallest external diameter, while the vapor body for unit H enlarges frusto-conically in its downward extent. The next three vapor bodies for units G, F, and E are of the next larger external diameter, the vapor body for the unit D again enlarges in a frusto-conical downward direction and the last three vapor bodies for the unit C, B, and A are of the largest external diameter. This provides a non-limiting example of change in size of the vapor bodies in relation to temperature and pressure change in the column.

Assuming the liquor accumulated in the tank 1 would have a temperature of 56° C., it would be heated in passing through unit A to a temperature of 61° C., by vapor flashing at 71° C. in that unit. Then in unit B vapor flashing at 76° C. would heat the liquor to 67° C. Going up through the column in generally similar increments, liquor emerging from unit I would have been heated to 96° C. and in passing through unit J would be further heated to 103° C. by vapor flashing at 111° C. In unit K the liquor would be heated to 110° C. by vapor flashing at 118° C. That liquor would then be heated by live steam at 132° C. in the heat exchanger 44, and would emerge therefrom at a temperature of 125° C. The liquor at this temperature would be that providing the vapor having a temperature of 118° C. after flashing in unit K. The pressures from unit to unit would, of course, vary as a result of the flashing and as a result of the action of the vacuum pump 35, as would be well known to those skilled in the art.

Figure 7:
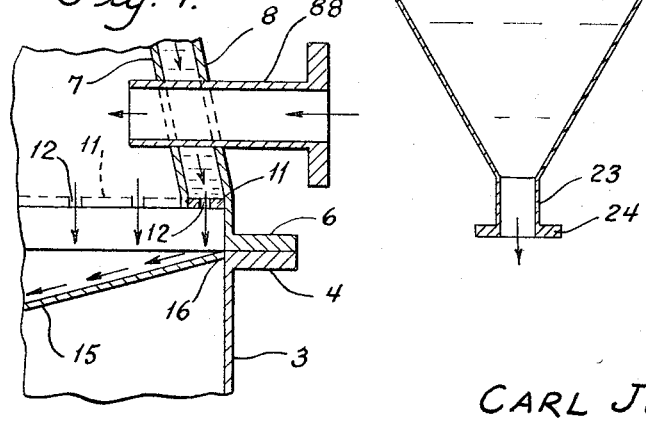
FIG. 7 is a fragmentary vertical section further enlarged of the conduit for introducing feed liquor into the chamber at the bottom of the evaporator.

Finally, as best seen in FIG. 7, feed liquor as needed is introduced into the vapor body 5 just above the bottom thereof through the conduit 88.

In FIGS. 8, 9, and 10 there is shown a modified construction of multi-stage flash evaporator in accordance with the invention. In such figures, which are similar to FIGS. 3, 4 and 5, respectively, parts which are the same as those in the first described embodiment are designated by the same reference characters. The difference between the two embodiments lies in the substitution of vertically disposed, rectangular tubular heating elements 63' for the circular cylindrical tubes 63 of the first embodiment. Such modified construction is preferred, in some instances, because of the extended heating surfaces and thus the better heat transfer which they provide. The heat exchanger may also be of the plate type. Both the rectangular tube and plate type heat exchangers are less expensive to make than the cylindrical tubular type.

From the foregoing it is believed that the construction and operation of the apparatus of the invention and the advantages achieved thereby will be readily apparent to those skilled in the art. It is also to be understood that though particular embodiments of the invention involving particular details of construction have been shown and described, departures therefrom might well suggest themselves to those skilled in the art without involving any departure from the spirit and scope of the invention.

Speaking more generally, since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. A multi-stage flash type evaporator which comprises a plurality of units, each of said units including a vapor body and an indirect heat exchanger extending through said vapor body, the vapor space within said vapor bodies being bounded by a substantially cylindrical side wall, a top, and a bottom, said units being mounted one on top of the other in the form of a column, the bottom of one vapor body forming the top of the next vapor body, each of said heat exchangers having a shell, each shell having an opening in its upper portion thereof opening into the vapor space, means including an enclosure surrounding the vapor body for the passage of liquid to be flash evaporated from one unit to the next lower unit down through the column, each of said heat exchangers having means providing channels with indirect heating surfaces isolated from and located in the space within said shell, means connecting the channels of successive heat exchangers in series, and means to circulate liquid to be evaporated through the series connected channels of the heat exchangers in the direction from the bottom to the top of the column and thereafter through successive vapor bodies of the units in the direction from the top to the bottom of the column, said openings in said shells providing for the passage of flash vapors directly from the vapor space inside the vapor bodies into their respective heat exchangers and into indirect heat exchange relationship with liquor to be heated in said heat exchangers.

2. A multi-stage flash type evaporator which comprises a plurality of units, each of said units including a vapor body and a heat exchanger extending through said vapor body, the vapor space within said vapor bodies being bounded by a substantially cylindrical side wall, a top, and a bottom, said units being mounted one on top of the other in the form of a column, the bottom of one vapor body forming the top of the next vapor body, each of said heat exchangers having a shell, each shell having an opening in the upper portion thereof opening into the vapor space, means for the passage of liquid to be evaporated from one unit to the next down through the column, said passage for liquid to be evaporated including said cylindrical side wall and a second cylindrical side wall spaced outwardly therefrom providing a liquor chamber therebetween, and orifice members at the bottom of said chamber providing for the discharge of said liquid downwardly therethrough on the establishment of a desired pressure difference across the same, each of said heat exchangers having indirect heating surfaces within said shell, and means providing for the passage of liquid to be heated through said heat exchangers and up through said column, said openings in said shells providing for the passage of flash vapors directly from the vapor space inside the vapor bodies into their respective heat exchangers and into indirect heat exchange relationship with liquor to be heated in said heat exchangers.

3. An evaporator as in claim 2, and including plate means in said vapor bodies for receiving said downwardly flowing liquid from said orifice members and providing a zone for flash evaporation of a portion of such liquid and continuing downward flow of the remainder of the same, and said vapor bodies being provided with bottom openings providing for the upward ow of said flash vapor for introduction into the shell of the heat exchanger positioned above said flash zone.

4. A multi-stage flash type evaporator which comprises a plurality of units, each of said units including a vapor body and a heat exchanger extending through said vapor body, the vapor space within said vapor bodies being bounded by a substantially cylindrical side wall, a top, and a bottom, said units being mounted one on top of the other in the form of a column, the bottom of one vapor body forming the top of the next vapor body, each of said heat exchangers having a shell, each shell having an opening in the upper portion thereof opening into the vapor space, means surrounding said vapor body for the passage of liquid to be flash evaporated from one unit to the next down through the column, each of said heat exchangers having indirect heating surfaces within said shell, means providing for the passage of liquid to be heated through said heat exchangers and up through said column, said openings in said shells providing for the passage of flash vapors directly from the vapor space inside the vapor bodies into their respective heat exchangers and into indirect heat exchange relationship with liquor to be heated in said heat exchangers, and conduits for the passage of condensate from said flash vapors downwardly through said column from one of said heat exchangers to the next, said conduits including orifice plates, said orifice plates being formed to permit passage of a portion of uncondensed vapor along with said condensate.

5. A multi-stage flash type evaporator which comprises a plurality of units, each of said units including a vapor body and a heat exchanger extending through said vapor body, the vapor space within said vapor bodies being bounded by a substantially cylindrical side wall, a top, and a bottom, said units being mounted one on top of the other in the form of a column, the bottom of one vapor body forming the top of the next lower vapor body, each of said heat exchangers having a shell, each shell having an opening in the upper portion thereof opening into its vapor space, means including a second outer wall spaced from the cylindrical side wall penetrated by said heat exchangers for the passage of liquid to be flash evaporated from one unit to the next down through the column, each of said heat exchangers having indirect heat transfer surfaces within said shell, and means providing for the upward passage of liquid to be heated through said heat exchangers, said openings in said shells providing for the passage of flash vapors directly from the vapor space inside the vapor bodies into their respective heat exchangers to be condensed therein by indirect heat exchange relationship with liquor to be heated in said heat exchangers.

References Cited by the Examiner

UNITED STATES PATENTS

| 1,069,829 | 8/1913 | Thoens et al. | 202—174 |
| 1,548,063 | 8/1925 | Ray et al. | 159—18 |
| 1,799,478 | 4/1931 | Peebles | 159—2 |
| 2,413,292 | 12/1946 | Christensen | 159—18 X |

FOREIGN PATENTS

| 576,838 | 8/1924 | France. |

NORMAN YUDKOFF, *Primary Examiner.*

J. SOFER, *Assistant Examiner.*